May 27, 1930.  D. W. NEIL, JR., ET AL  1,760,250
VEHICLE WINDOW SHADE OR AWNING
Filed Oct. 24, 1927   2 Sheets-Sheet 1
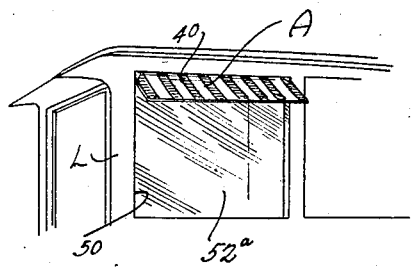
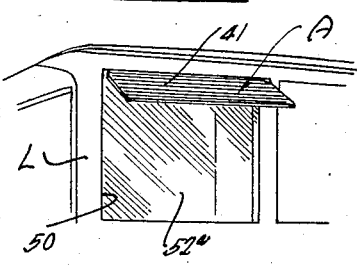
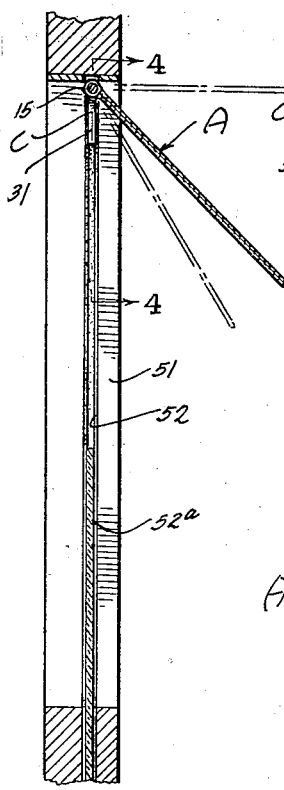
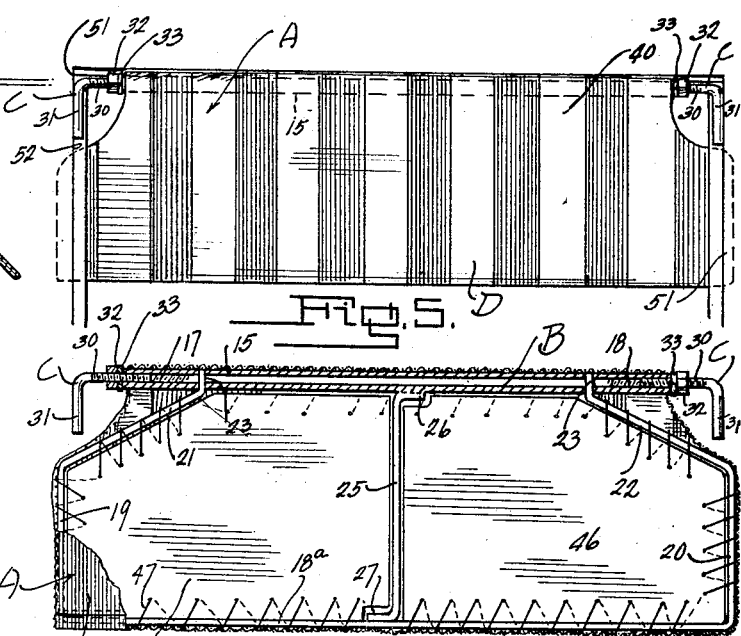
Daniel W. Neil Jr.
Albert B. Caskey
Inventors

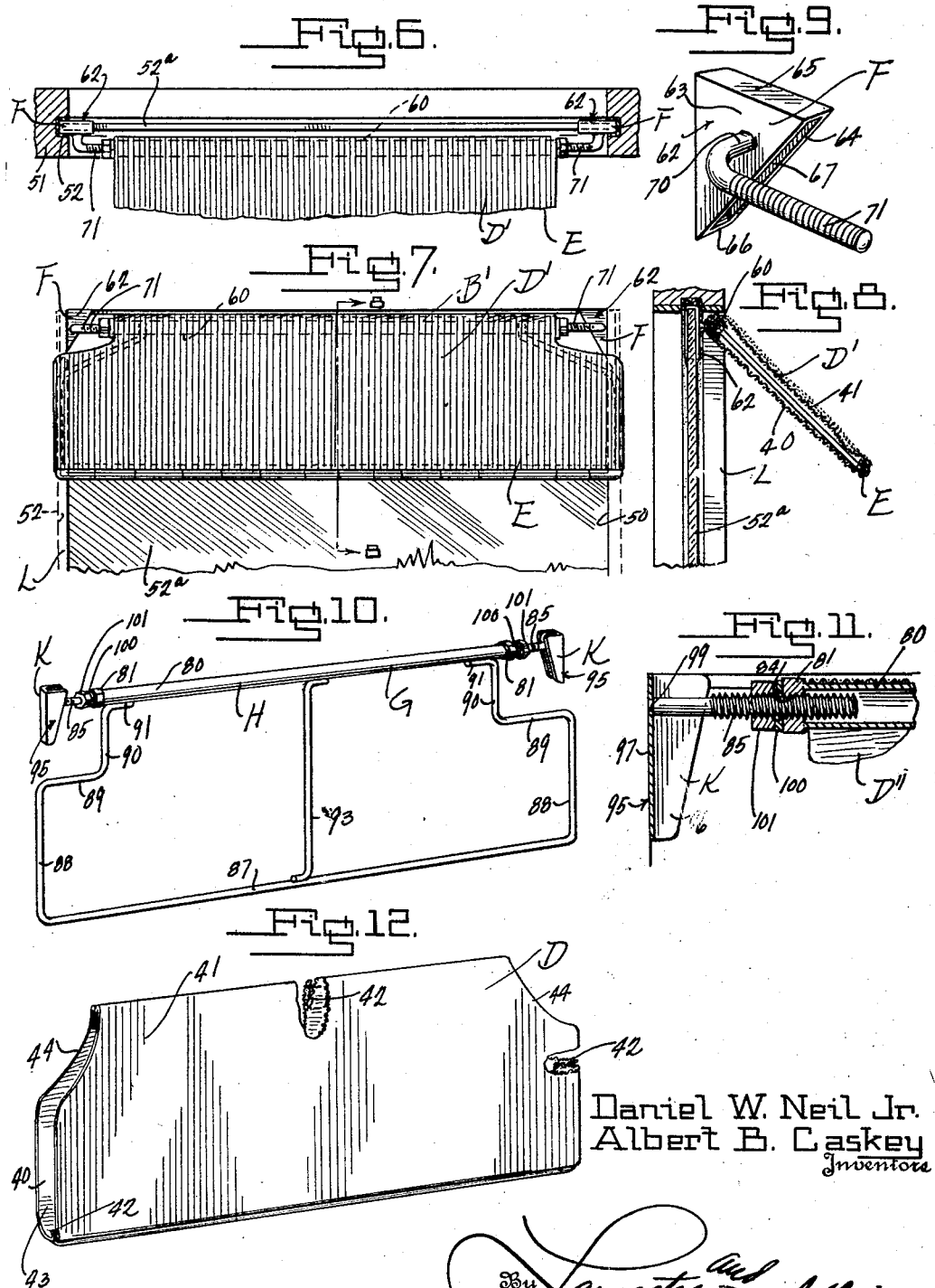

Patented May 27, 1930

1,760,250

UNITED STATES PATENT OFFICE

DANIEL W. NEIL, JR., AND ALBERT B. CASKEY, OF PONCA CITY, OKLAHOMA

VEHICLE-WINDOW SHADE OR AWNING

Application filed October 24, 1927. Serial No. 228,361.

This invention relates to improvements in awnings particularly well adapted for use upon the windows of automobiles of the closed car type.

The primary object of this invention is the provision of an improved window awning for automobiles, of an economical and durably constructed type which may be instantly removed or placed upon the window frame of the closed car type of automobile, without the use of extra attachments secured to the automobile, and without marring the surface of the car.

A further and important object of this invention is the provision of an awning for automobiles, of a reversible type, which will permit ready use of either side of the awning, as the exposed side.

A further object of this invention is the provision of an improved window awning for automobiles, having improved means to adjustably secure the same to various sizes of window openings.

A further object of this invention is the provision of an improved window awning having an offset frame to support the same so as to permit a compact closing of the window in the window opening, without interference by the awning.

A further object of this invention is the provision of an improved means to frictionally lock an awning at a desired angle with respect to a window opening.

A further object of this invention is the provision of an improved awning frame, having an improved cover which may be detached with respect thereto for cleaning or renewal purposes.

Other objects and advantages of this invention will be apparent during the course of the following detailed description.

In the accompanying drawings, forming a part of this specification, and wherein similar reference characters designate corresponding parts throughout the several views:

Figures 1 and 2 are perspective views of the front side window of an automobile of the closed car type, showing how the awning is attached thereto to permit the awning to expose different sides thereof, as a reversing feature.

Figure 3 is a vertical sectional view taken thru a closed car type of window opening, showing the application of the preferred type of awning thereto.

Figure 4 is a sectional view taken substantially on the line 4—4 of Figure 3.

Figure 5 is a vertical sectional view taken thru the awning structure in the plane of the awning, showing the frame and awning cover structure features thereof.

Figure 6 is a modified form of improved awning structure, by means of which the window may be compactly closed with respect thereto in a normal window opening.

Figure 7 is a front elevation of the awning structure of Figure 6.

Figure 8 is a sectional view of the awning structure of Figure 7, taken substantially on the line 8—8 of Figure 7.

Figure 9 is a perspective view of one of the window frame engaging ends of the frame structure of the awning illustrated in Figures 6 to 8 inclusive.

Figure 10 is a further modified form of the invention, showing novel frame details and normal adjustable window engaging members associated therewith at the top corners thereof, by means of which the awning may be adapted to various sizes of window openings.

Figure 11 is an enlarged sectional fragmentary view taken through one of the adjustable window engaging parts of the frame structure of the awning frame illustrated in Figure 10.

Figure 12 is a fragmentary perspective view of an awning cover, showing special structural features thereof, to make the same easily detachable from the awning frame, and to make the same reversible so that either side thereof may be the external exposed side.

In the drawings, wherein for the purpose of illustration are shown preferred and modified forms of the invention, the letter A may generally designate the preferred form of invention, which may comprise a frame B having adjustable window frame engaging members C associated at opposite sides thereof. An awning cover structure D may be provided for the frame B.

In the first modified form of awning structure illustrated in Figures 6 to 8 inclusive, the letter E may generally designate this awning structure, which may include a frame B' of substantially the same construction as the frame B of the preferred form of invention A, but having special window frame engaging members F adjustably associated therewith. The awning cover D' may be of the same nature as the awning cover D of the preferred form of invention.

In the second modified form of invention G illustrated in Figures 10 and 11 the same may include the frame H illustrated in Figure 10, having the special adjustable window frame engaging members K associated therewith, and the said awning G may include the cover D" of the same nature as the awning cover D illustrated in Figures 4, 5 and 12 of the drawings.

Referring to the form of invention A, the frame B thereof consists of a top tube or rod 15, which may be solid, or of tubular form as shown in the drawings. Preferably the ends thereof are open and provided with screw threaded sockets 17 and 18 wherein the members C are adjustable as will be subsequently described. The frame B furthermore consists of the outer bar 18ª having rigidly connected therewith the side bars 19 and 20, in right angled relation with the outer bar 18ª; the side bars 19 and 20 extending toward the ends of the top bar or rod 15, and preferably bevelling in a converging relation at 21 and 22 respectively, and being secured at 23 in approved relation to the end portions of the top bar 15 inwardly of the screw threaded sockets, so that the screw threaded sockets 17 and 18 extend laterally beyond the attaching ends 23, as shown in Figure 5 of the drawings. In lieu of being bevelled at 21 and 22 the frame sides 19 and 20 may be suitably offset inwardly in other approved relation, so that the connections thereof on the top rod 15 lie inwardly of the extreme ends of said rod 15, to leave room for the adjustment of the attaching members C, so that the frame may be adapted to window openings of various widths. A rod brace 25 may be provided between the bar 15 and bar 18ª, substantially midway between the side bars 19 and 20, and extending normally to the frame portions 15 and 18ª, and being suitably secured respectively thereto at 26 and 27, as by welding.

The adjustable members C are of the same construction, each being adaptable for use at either end of the rod 15 in the screw threaded sockets 17 or 18. The same includes a threaded shank 30 for screw threaded adjustment in the sockets 17 or 18, as the case may be, and furthermore includes a right angled window frame engaging arm 31 in right angled relation with respect to the shank 30, as shown in Figure 5. It is quite apparent that rotation of the members C in the screw threaded sockets will feed the members C inwardly or outwardly, dependent upon the direction of rotation, and thus increase or decrease the effective spacing of the members C with respect to each other.

In order to be sure that there will be no relative movement of the members C with respect to the bar 15, or relative rotation, after the members C have once been set, in their proper adjustment on the bar or rod 15, it is preferred to provide a lock nut 32, and lock washer 33, on each of the screw threaded shanks 30; the lock washer 33 bearing against the end edge of the tube 15 and the lock nut 32 of course being clamped thereagainst in order to frictionally bind the member C in its adjusted position on the tube or rod 15, as can readily be understood.

Referring to the cover D, the same is best structurally illustrated in Figure 12 of the drawings. It comprises opposed panels 40 and 41, preferably striped or figured differently, in a contrasting relation, so that either side may be presented to the exterior, and thus producing a reversible awning. The panels 40 and 41 have the margins at the top, one side, and the bottom thereof turned inwardly as shown at 42 in Figure 12 of the drawings, and stitched together. The other side is open as at 43 prior to assemblage on the frame B, B' or H, as the case may be. The upper corners of the panels 40 and 41 are cut away as shown at 44 in Figure 12 of the drawings. The frame is then slipped into the pocketed cover, and at the open side the same may be closed in suitable manner. At the bevelled portions 44 of the cover it is to be noted that the adjustable members C extend from the cover, as well as the lock nuts and lock washers, and just the tip ends of the top bar or tube, as shown in various figures of the drawings. In lieu of stitching, the end of the sack may be closed or fastened by means of snaps, hooks and eyes, buttons, laces, or the like, as is readily apparent, and the panels forming the cover may be secured together otherwise than is shown, just so a sack is provided for assembling the frame of the awning structure therein so as to permit the reversing of the awning, and preferably expose contrasting sides, as desired, and shown in Figures 1 and 2 of the drawings.

As a means of reinforcing the positioning of the cover on the frame, card board parts 45 and 46 may be placed within the area of the frame and suitably stitched or sewn as by yarn 47 to the rod or bar portions 18, 19, 20, 21 and 22 of the frame B, as shown in Figure 5. This holds the cardboard 45 and 46 in the plane of the frame. This card board may be of the corrugated rigid type, and holds the panels of the cover in a true plane against sagging.

When the cover is assembled on the frame the panels may be suitably secured along the bevelled edges 44, as can readily be understood.

As to the attachments of the improved awning on automobile window frame, or other window frame, in Figures 1 and 2 have been shown an automobile L having a window opening 50 therein at the top of which the awning is to be positioned. The frame of the window forming the opening 50, as is well known, has the side styles 51 thereof provided with vertical grooves 52, preferably filled with some yieldable material, such as felt, and wherein the side margins of the window glass 52$^a$ normally slide.

In the application of the awning to such type of window frame, the window 52$^a$ is lowered, and the end members C of the awning frame are adjusted with the lock nuts 32 released. The initial adjustment is secured by experimentation; one of the members C being placed with its leg portion 31 in one side groove of the window, and at a lower elevation the other member C is then placed in the other groove 52 at the opposite side of the window opening, and the members C are then brought to the same elevation at the top of the window frame grooves 52. The legs 32 will then bind firmly against the bottom of the grooves 52 against the material therein, to frictionally hold the frame in position. Of course the members C must be adjusted longitudinally of the bar 15 to secure the desired frictional clamping action of the frame in the grooves 52 of the window opening. When the proper adjustment has been secured the lock nuts 32 are then clamped with the lock washers 33 against the end edges of the tube 15 to frictionally support the frame B at the desired angle with respect to the window opening. This angle may be varied merely by annually moving the frame B to change the angle, after the members C are in the groove 52 of the window opening.

The view in Figure 4 shows that the ends of the awning overlap the side styles of the window frame, which may be accomplished by reason of the cutting away of the top corners of the awning structure to permit the proper adjustment of the members C to suit the width of the window opening. This overlapping of the sides of the awning structure with the window frame insures that effective shade will be given.

In form of invention E, many of the characteristics of the awning A are present. The frame B' is of the same construction as the frame B of the preferred form of invention, including a top rod or tube 60 corresponding to the top bar or tube 15 of the frame B of the preferred form of invention A.

The cover D' for the modified form of invention is similar in structure to the cover D above described, and is reversible, that is the opposite panels thereof may be of contrasting material, or contrastingly figured, and of a sack nature to readily slip on to the frame B'.

A novel feature of the modified form of invention described, is the provision of the adjustable members F, each of which includes a substantially triangular shaped hollow body 62 adapted to slide in the window frame groove 52. This body 62 includes the triangular spaced side walls 63 and 64 connected by a top wall 65 and a side wall 66, the parts 63, 64, 65 and 66 being integral or rigidly secured together to provide a pocket 67 opening at the hypothenuse side of the body 62. The walls 65 and 66 are in right angled relation to each other and the wall 66 rests against the bottom of the groove 52 of the window frame, with the pocket 67 opening diagonally downwardly in the window opening, so that the upper corners of the window 52$^a$ may slip therein to permit an effective and compact closing of the window 52$^a$ in unobstructed relation by the awning. Rigid with the outer wall 63 of the body 62 is a supporting stem 70, which may be soldered or welded or otherwise affixed to the wall 63, normal thereto; a screw threaded shank 71 being arranged in right angled relation with the stem 70; this screw threaded shank 71 being the shank which is adjusted into the screw threaded end of the top tube or rod portion 60 of the frame B', in the same relation as the members C are adjustable in the tube 15 of the frame of the preferred form of invention A, above described. When the frame tube 60 has these members F adjustably positioned thereon and slidable in the side grooves of the window opening, as shown in Figures 6 of the drawings, the frame tube or bar 60 is positioned forwardly of the plane of the window pane 52$^a$, to permit the sliding of the latter in an unobstructed relation by the awning frame structure, as is obvious from Figure 6 of the drawings, so that the window may be closed to the position illustrated in Figure 8 of the drawings. It is to be noted that the corners of the window close into the pocket 67 of the awning fastener body 62.

Referring to the second modified form of invention, the frame H thereof includes the preferably tubular top bar 80, the ends of which has nuts 81 welded or rigidly secured thereto; the nuts 81 having screw threaded openings 84 therethrough to receive the screw threaded shanks 85 of the special adjustable members K which grip against the side styles of the window frame. The frame H furthermore includes the lower rod or bar 87 having the side bars 88 in right angled relation therewith; the latter at their upper ends being offset inwardly at 89 and then in right angled relation at 90 and being secured at 91 to the ends of the tube 80 inwardly of the nuts 81 secured at the ends thereof, as shown in Figure 10 of the drawings. This angling of the corners of the frame is for the same purpose as the bevelled portion 21, as provided on the preferred form of frame B above described. A transverse brace bar 93 may be provided in right angled relation between the tube 80 and the outer bar 87, suitably secured as by welding or soldering thereto, as shown in Figure 10 of the drawings. A cover similar to the cover D may be applied to the frame H, as can readily be understood, and as shown at D″ in Figure 11 of the drawings.

The special members K are provided for the same general purpose as the members F of the first modified form of invention E. These members K comprise channel shaped bodies 95, each including the spaced side walls 96 secured together by a wall 97 which abuts against the bottom of the groove in the window frame, as can readily be understood. This provides a channel opening in the body 95, within which the top corners of the conventional window pane of the window may be received. The shank 85 is secured at 99 to the bottom wall 97 of the channel body 95, and extends transversely through the pocket of the channel body 95, at the top thereof, and projects at the screw threaded end for adjustment in the nut 81, as above mentioned. Lock washer 100 and lock nuts 101 may be provided on the screw threaded shank 85 to engage nut 81 in a desired adjusted relation to hold the awning B in a desired angled relation with respect to the window, as can readily be understood from the foregoing description of the other forms of invention.

The frame top bar may thus be formed with threaded socket openings at the ends thereof, either by internally screw threaded bars or by fixing nuts thereto. If desired the adjustable end members on the top bar of the frame may be secured by set screws, or other expedients.

The cover for the awning may be of canvas, velvet, corduroy, plush, velour, or like material, and it is preferred, inasmuch as the awning is of a reversible type, that one side of the cover be made of one material and the other side of another material; the materials being contrastingly figured or colored. If desired fringe may be secured at the free edges of the awning cover, as can readily be understood.

While in the forms shown both ends of the top bars or tubes are provided with right hand threads, so that the clamping effect on the window frame may be the same at all times independent of the adjusted angular position of the awning, yet right and left hand threaded sockets may be provided for the adjustable members, if desired.

Various changes in the shape, size, and arrangement of parts may be made to the forms of invention herein shown and described, without departing from the spirit of the invention or the scope of the claims.

We claim:

1. In a window awning of the class described the combination of a frame including a top bar, an outer bar, and side bars connecting the ends of the outer and top bars, the upper ends of the side bars being offset inwardly towards each other, and window engaging frame members adjustable on the ends of the top bar at a location inwardly of the side bars.

2. In a window awning of the class described the combination of a frame including a top bar, an outer bar, and side bars connecting the ends of the outer and top bars, the upper ends of the side bars being offset inwardly toward each other, window engaging frame members adjustable on the ends of the top bar at a location inwardly of the side bars, said adjustable members being of L-shaped formation and each having a window engaging part which may be adjusted to either side of the plane of the frame.

3. In an awning structure the combination of a frame including an upper rod having end outwardly facing screw threaded sockets, side frame pieces connected with the said rod short of the screw threaded sockets, with the side frame pieces extending therefrom in spaced outwardly extending relation to a point beyond the screw threaded sockets and there being turned in parallel relation, awning material on said frame side pieces and said rod, window casing adjusting members screw threaded in said threaded sockets and adjustable therein so as to lie inwardly of the extreme side margins of the side frame pieces, and releasable nuts threaded on said members and adapted to frictionally engage in a locking relation against the ends of the frame rod whereby to fix the said members in a definite adjusted relationship with respect to the plane of said frame.

4. In an awning structure, the combination of a frame including an upper rod portion having end outwardly facing screw threaded sockets, an awning on said frame, window casing engaging members having screw threaded shanks adjustably threaded in said end threaded sockets of said rod so that said members may be adjusted to extend laterally of the awning frame into engagement with a window casing, said members at their free ends having means for engagement with a window casing slot to prevent the rotation of said members, and releasable nuts threaded on the screw threaded shanks of said members and movable into frictional engagement against the ends of the frame rod for holding the latter against rotation and supporting the awning frame in a desired angular relation.

DANIEL W. NEIL, Jr.
ALBERT B. CASKEY.